July 20, 1965     H. P. McKOWN, JR     3,195,204
WORM DRIVEN HOSE CLAMP
Filed April 23, 1964
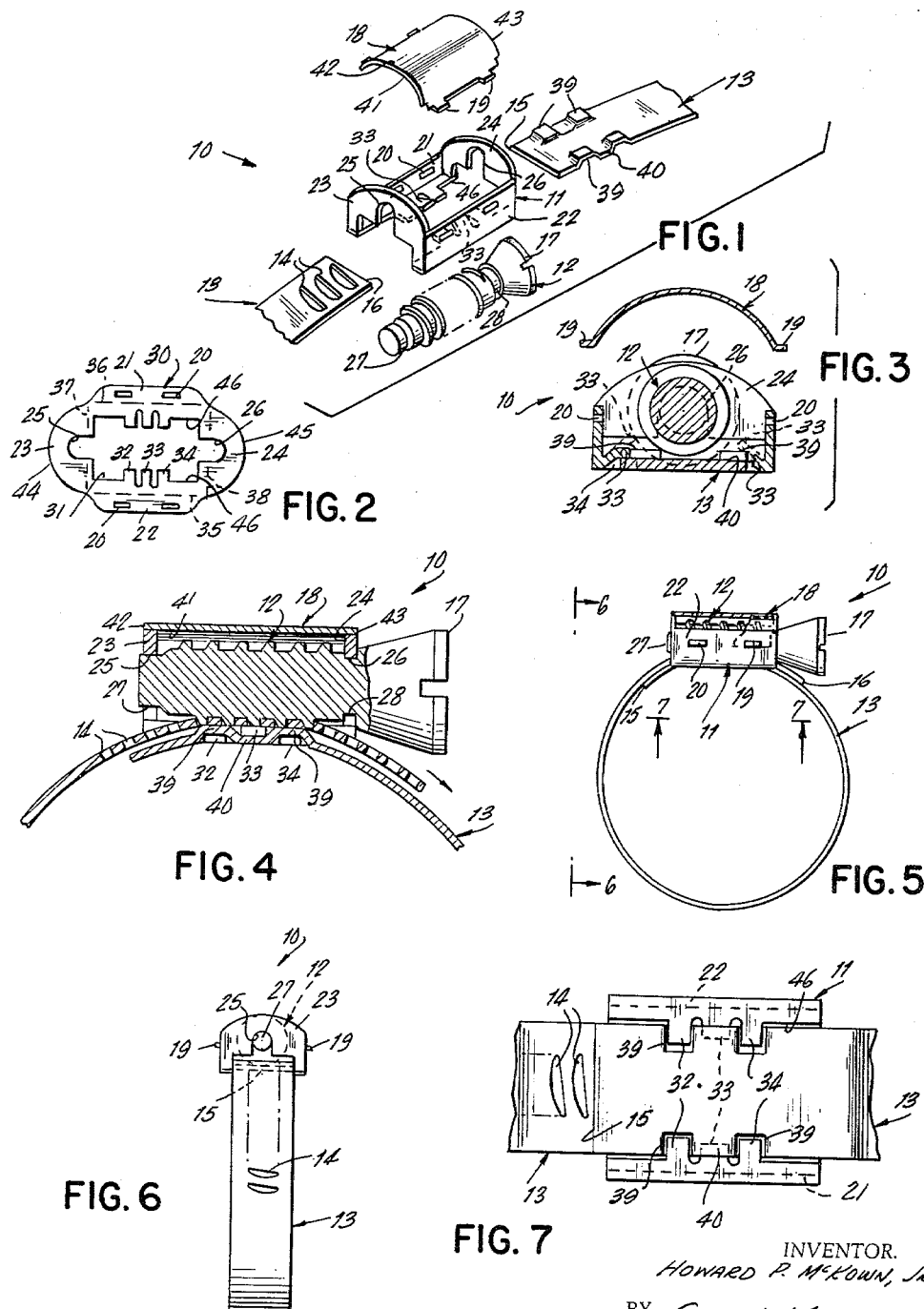
INVENTOR.
HOWARD P. McKOWN, JR.
BY Albert F. Kronman
ATTORNEY

United States Patent Office 3,195,204
Patented July 20, 1965

3,195,204
WORM DRIVEN HOSE CLAMP
Howard P. McKown, Jr., Export, Pa., assignor to Breeze Corporations, Inc., Union, N.J., a corporation of New Jersey
Filed Apr. 23, 1964, Ser. No. 362,103
5 Claims. (Cl. 24—274)

This invention relates to hose clamps and more specifically to clamps in which the clamping band is driven by a tangentially disposed worm.

Worm driven hose clamps in which the worm is carried within a housing in tangential contact with the tightening band are well known. Such clamps are preferred where great strength, smooth operation and excellent sealing performance is desired. However, the structure and manufacture of clamps of this type has heretofore involved a large number of parts and operations which have resulted in comparatively high costs.

Accordingly, it is an object of the present invention to provide a highly simplified worm driven hose clamp.

Another object of the present invention is to provide lower cost worm driven hose clamps.

A further object of the present invention is to simplify the assembly and manufacture of worm driven hose clamps.

A feature of the present invention is its unitary saddle construction.

Another feature of the present invention is its simplified saddle and band interlocking structure.

Still another feature of the present invention is its novel worm supporting structure.

A further feature of the present invention is its simplified cover member.

The invention consists of the construction, combination and arrangement of parts, as herein illustrated, described and claimed.

In the accompanying drawings, forming a part hereof is illustrated one form of embodiment of the invention, and in which:

FIGURE 1 is an exploded somewhat isometric view of a complete embodiment of the present invention with certain parts indicated by dashed lines.

FIGURE 2 is a plan view of the blank from which the hose clamp saddle is formed.

FIGURE 3 is a cross sectional view of the clamp shown in FIGURE 1 in a partially assembled state.

FIGURE 4 is a fragmentary view in longitudinal section of the assembled hose clamp.

FIGURE 5 is a view in side elevation of the assembled clamp with certain portions broken away.

FIGURE 6 is a view of the hose clamp taken on line 6—6 of FIGURE 5.

FIGURE 7 is a bottom plan view somewhat enlarged showing the interlock between the saddle and band.

Referring to the drawings and particularly to FIGURES 1 thru 5, 10 indicates a hose clamp made in accordance with the present invention. The hose clamp 10 consists of a housing 11, a clamp actuating worm 12 journaled within the housing and a band 13 secured at one end 15 to the housing. The free end 16 of the band 13 is provided with a series of spaced slots or openings 14 which are engaged by the worm 12 as the ends 15, 16 of the band 13 are overlapped within the housing 11, in the well known manner. Rotation of the worm 12 by means of the slotted head 17 serves to tighten or loosen the clamps.

A housing cover member 18 may be provided where the ambient conditions of use may result in foreign matter getting into the housing and interfering with the desired operation of the clamp. The cover member 18 overlies the housing 11 and is secured thereto by outwardly extending lugs 19 which extend from opposed margins of the cover. The lugs 19 are received within openings 20 provided in the walls of the housing 11.

The housing 11, best shown in FIGURE 1, consists of a unitary box-like structure having spaced upstanding side walls, 21, 22, a front wall 23 and a rear wall 24. The front and rear walls are cut away as indicated at 25, 26 to provide worm receiving recesses in the housing 11. The worm 12 is formed with a bearing surface 27 on the front thereof which rides within the recess 25. A second bearing surface 28 is provided on the worm between the threaded portion 29 and the slotted head 17. The second bearing portion 28 rotates within the recess 26. In the embodiment illustrated the worm 12 is held from longitudinal movement within the housing 11 by the engagement of the recesses 25, 26 and the bearing surfaces 27, 28. However, it is within the purview of the present invention to modify the shape of the recesses 25, 26 and the worm 12 to provide a quick disconnect-type of operation.

The housing 11 is formed from a single flat blank of metal 30 best shown in FIGURE 2. The blank may be generated in a single stamping operation with the recessed front and rear walls 23, 24 and the side walls 21, 22 lying in the same plane. The center of the blank 30 is punched out to leave a somewhat rectangular opening 31 having three detents 32, 33, 34 extending inwardly thereof from opposite sides of the opening 31 and adjacent the side wall forming portions of the blank.

When the blank 30 is placed within a suitable forming die (not shown) and bent along the dashed lines 35, 36, 37, 38 shown in FIGURE 2, it will assume the box-like shape of FIGURE 1. The detents 32, 33, 34 extend inwardly from small flanges 46, toward the center of the box-like housing in opposed relationship at the bottom thereof. For the purpose of assembly, the central detent 33 on each side of the opening 31 is bent upwardly as shown in FIGURES 1, and 3.

The end 15 of the band 13 which is to be secured to the housing is embossed with inwardly and outwardly offset portions 39, 40 along each of the major margins of the band. The offset portions are of a size and disposition to receive the detents 32, 33, 34 of the housing 11.

In assembling the hose clamp described herein, the worm 12 is first dropped into the recesses 25, 26 of the housing 11. The end 15 of the band 13 is next slipped into the housing 11 so that its embossed portion is in register with the detents 32, 33, 34. At this juncture the upwardly bent detents 33 will lie above the band offset portions 40 and the other detents 32, 34 will underlie the offset portions 39. A suitable tool (not shown) is then brought to bear against both sides of the assembled band and detents to press them into a smooth interlocking engagement as best shown in FIGURE 7. When the band 13 is thus secured to the housing 11, the flanges 46 and band form a continuous surface which when brought against a hose or similar resilient member will insure a fluid tight seal therearound. When the slotted end 16 of the band 13 is slipped into the housing 11 as shown in FIGURES 4, 5 and 6 the clamp may be tightened.

If it is desired to enclose the housing, the cover member 18 is slipped into place on top of the said housing. The cover member is bowed as indicated at 41 and is provided with short tabs 42, 43 which extend at each end thereof and overlie the curved tops 44, 45 of the end walls 23, 24. When the cover member 18 is forced down upon the housing 11, the bowed portion 41 is somewhat flattened and the lugs 19 enter the openings 20 in the housing 11 to secure the cover member in place.

It will be seen from the foregoing that there has been provided a tangentially disposed worm driven hose clamp which is simple in construction, requires a minimum number of parts and lends itself to modern automated assembly and manufacturing techniques. The clamp requires no welding, riveting or staking operations and the worm 12 can be inserted before the band is secured to the housing. Since the housing 11 carries the worm 12 all of the stresses set up during operation of the clamp are transmitted directly to the rigid box-like member best able to absorb them.

Having thus fully described the invention, what is claimed as new and desired to be secured by Letters Patent of the United States is:

1. A worm driven hose clamp comprising, a unitary box-like housing, spaced side walls and a front and rear wall on said housing, a worm journaled within the front and rear walls and disposed within the housing, a head at one end of the worm, an elongated band, an embossed portion comprising inwardly and outwardly extending recesses along each of the major margins of the band and spaced from one end of the band, longitudinally spaced band securing means carried by the housing lockingly engageable with the embossed portion of the band, and there being a series of spaced slots in the free portion of the band for operative engagement with the worm.

2. A worm driven hose clamp comprising, a unitary box-like housing, spaced side walls and a front and rear wall on said housing, a worm journaled within the front and rear walls and disposed within the housing, a head at one end of the worm, an elongated band, an embossed portion comprising inwardly and outwardly extending recesses along each of the major margins of the band and spaced from one end of the band, longitudinally spaced inwardly extending detent band securing means carried by the housing lockingly engageable with the embossed portion of the band, and there being a series of spaced slots in the free portion of the band for operative engagement with the worm.

3. A worm driven hose clamp comprising, a unitary box-like housing, spaced side walls and a front and rear wall on said housing, there being openings in the side walls spaced from the upper margins thereof, a cover member for the housing, outwardly extending lugs on said cover member for engagement with the side wall openings, a worm journaled within the front and rear walls and disposed within the housing, a head at one end of the worm, an elongated band, an embossed portion spaced from one end of the band comprising alternating inwardly and outwardly extending recesses along the major margins of the band, longitudinally spaced band securing means carried by the housing lockingly engageable with the embossed portion of the band, and there being a series of spaced slots in the free portion of the band for operative engagement with the worm.

4. A clamp according to claim 3 in which the cover member is bowed and provided with tabs to overlie the front and rear walls of the housing.

5. A worm driven hose clamp comprising a unitary box-like housing, spaced side walls, flanged portions extending inwardly from the bottom of each of the side walls and a front and rear wall on said housing, a worm journalled within the front and rear walls and disposed within the housing, a head at one end of the worm, an elongated band, an embossed portion comprising alternating inwardly and outwardly extending recesses along the major margins of the band spaced from one end of the band, longitudinally spaced inwardly extending detent band securing means carried by the housing flanged portions and lockingly engageable with the embossed portion of the band, and there being a series of spaced slots in the free portion of the band for operative engagement with the worm.

References Cited by the Examiner

UNITED STATES PATENTS

| 759,255 | 5/04 | Ferguson et al. | |
|---|---|---|---|
| 2,395,273 | 2/46 | Hill et al. | 24—274 |
| 2,767,455 | 10/56 | Schaefer | 24—274 |
| 3,035,319 | 5/62 | Wolff | 24—274 X |
| 3,087,220 | 4/63 | Tinsley | 24—274 |

FOREIGN PATENTS

| 1,123,890 | 6/56 | France. |
| 1,268,686 | 6/61 | France. |
| 576,697 | 4/46 | Great Britain. |

DONLEY J. STOCKING, *Primary Examiner*.